O. KNÖPFLI.
ALTERNATING CURRENT MOTOR.
APPLICATION FILED APR. 29, 1912.
1,148,592.
Patented Aug. 3, 1915.
2 SHEETS—SHEET 1.
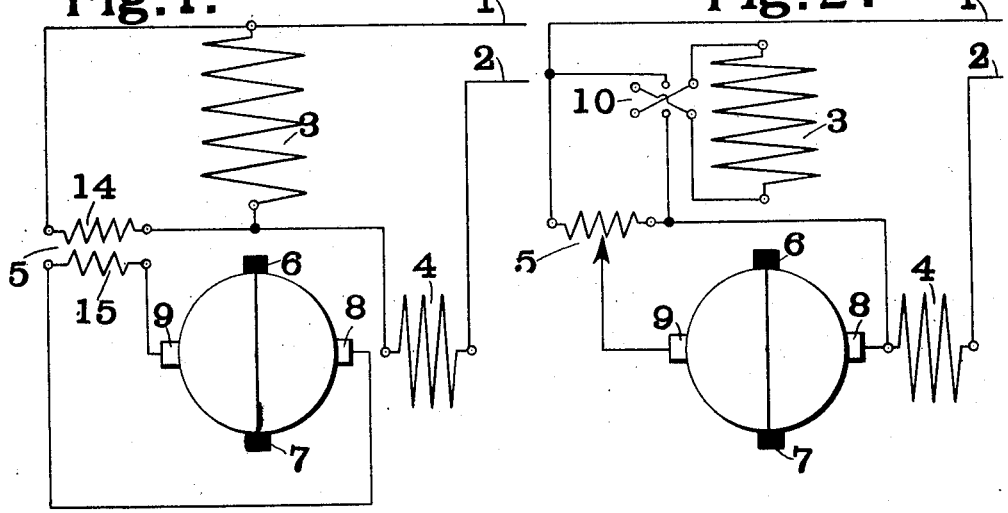
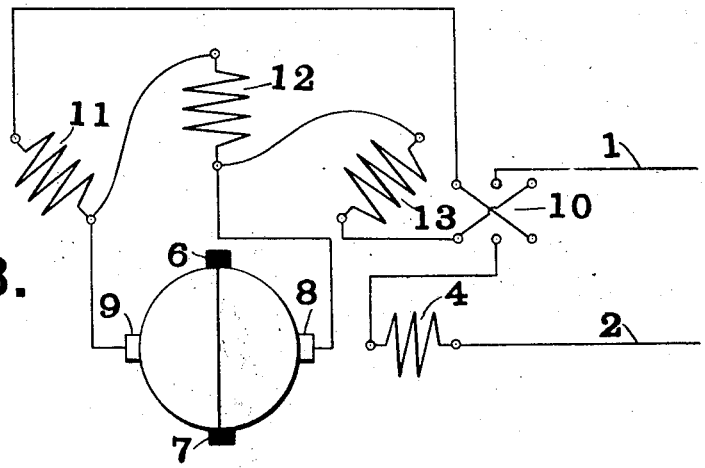
WITNESSES:
Chas. A. Becker,
INVENTOR
Otto Knöpfli
BY
E. E. Huffman
ATTORNEY

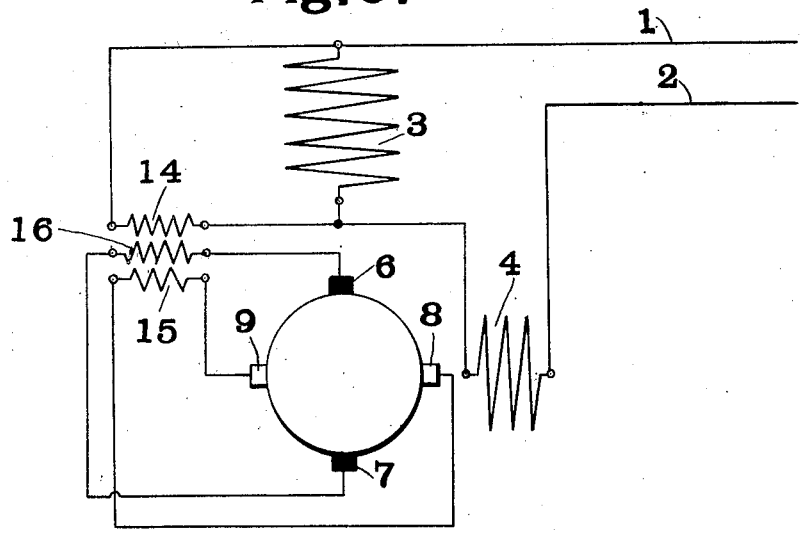
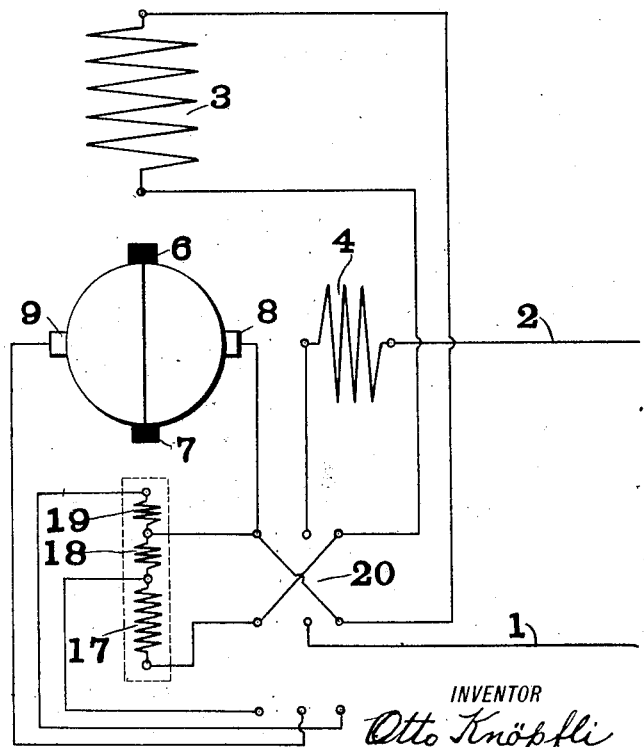

UNITED STATES PATENT OFFICE.

OTTO KNÖPFLI, OF ZURICH, SWITZERLAND, ASSIGNOR TO MASCHINENFABRIK OERLIKON, OF OERLIKON, NEAR ZURICH, SWITZERLAND.

ALTERNATING-CURRENT MOTOR.

1,148,592.   Specification of Letters Patent.   Patented Aug. 3, 1915.

Application filed April 29, 1912. Serial No. 693,814.

*To all whom it may concern:*

Be it known that I, OTTO KNÖPFLI, a citizen of Switzerland, residing at Zurich, Switzerland, have invented a certain new and useful Alternating-Current Motor, of which the following is such a full, clear, and exact description as will enable any one skilled in the art to which it appertains to make and use the same, reference being had to the accompanying drawings, forming part of this specification.

The single phase commutator motor to which this invention relates belongs to the class of repulsion motors in which change in the direction of rotation is produced by changing the magnetic axis of the stator and not by changing the position of the brushes. In such machines there is generally an auxiliary reversible winding displaced by about ninety (90) electrical degrees from the main stator winding and connected in series therewith. The rotor has a commuted winding and a set of short-circuited brushes in the axis of the main stator winding. The starting torque depends, in such motors, upon the choice of the number of turns of the auxiliary winding. In operation, these motors have a series characteristic, *i. e.*, the number of revolutions is dependent within wide limits upon the load and upon the position of the axis of the resultant stator magnetization with reference to the axis of the short-circuited brushes.

Different arrangements have been proposed in order to give these motors a shunt operating characteristic, or at least to prevent them from racing under sudden decrease of load. Most of these arrangements involve changing the connections of the motor when it has reached the desired speed and this is done either by hand or by the aid of centrifugal devices. In such machines, there are, as a rule, a set of auxiliary brushes disposed at an angle to the working brushes and these auxiliary brushes are short-circuited when the desired speed has been reached, thus giving to the machine the characteristics of a single phase induction motor. These auxiliary brushes instead of being directly short-circuited, may be connected to the line either directly or through a transformer.

The object of this invention is to provide means for changing a single phase commutator motor of the class above described into a motor having a shunt characteristic which will not involve any change in connections between the starting and running conditions, and will at the same time allow the motor to develop a large starting torque while not causing it to be limited to a nearly synchronous speed as determined by the number of poles of the motor and the periodicity of the supply.

A further object is to provide an arrangement whereby the motor will act as an electro-dynamic brake if disconnected from the line.

In the drawings, Figure 1 represents one form of my motor; Fig. 2 represents a motor similar to that of Fig. 1, but provided with a switch for reversing the direction of rotation; Fig. 3 shows a modification in which the main stator winding is divided into a number of groups of coils; Figs. 4 and 5 illustrate further modifications.

3 represents the main inducing winding and 4 an auxiliary winding displaced by substantially ninety (90) electrical degrees therefrom. These windings are connected in series. The rotor is provided with a commuted winding and with a set of short circuited working brushes 6, 7 whose axis approximately coincides with the axis of the main inducing winding 3. Displaced by about ninety (90) electrical degrees from the working brushes is a set of exciting brushes 8, 9 which are connected to the secondary winding 15, of the transformer or potential regulator 5, the primary winding 14 of the transformer being connected in parallel with the main inducing winding 3 or a part thereof. Instead of having two separate windings, the transformer may be of the form shown in Fig. 2.

To change the direction of rotation of the motor, the direction of the current through the main inducing winding is reversed by means of the two-pole switch 10 in the motors illustrated in Figs. 2 and 3, and by the three-pole switch 20 in the motor shown in Fig. 4. For motors which run at a speed widely differing from synchronism, the direction of the E. M. F. impressed upon the exciting brushes should preferably not be changed when the current through the main inducing winding is reversed, and the switches and connections shown in Figs. 2, 3 and 4 are so arranged that changing the position of the switches will not reverse the direction of the E. M. F. impressed on the exciting brushes.

The main inducing winding may be divided into a number of coils as illustrated in Fig. 3 where 11, 12 and 13 are sub-divisions of this winding. In this motor the current through all of the coils 11, 12 and 13 is reversed to reverse the direction of rotation. Instead of connecting the exciting brushes to the main inducing winding through a transformer, they may be directly connected. In Fig. 3, these brushes are shown connected in parallel with coil 12, but they may be connected in parallel with any one or more of the main inducing coils as desired. When the exciting brushes are conductively connected to the inducing winding, the motor will act as an electro-dynamic brake when the line current is cut off.

In motors which are designed to run at approximately synchronous speed and have the stator winding divided into a number of coil groups, and in which the auxiliary brushes are connected to only a relatively small part of the entire winding, as in Fig. 3, it is not absolutely necessary that the direction of the E. M. F. impressed upon the auxiliary brushes be unchanged when the direction of the current in the main inducing winding is changed.

In Fig. 4, a three-pole switch 20 and a single coil transformer having three interconnected groups of turns 17, 18 19 are provided and the connections are so arranged that the winding 3 always remains conductively connected to the exciting brushes but the direction of the E. M. F. impressed upon these brushes is not changed when the direction of the current through the winding 3 is reversed, the group 19 being connected to the brushes in one position of the switch and the group 18 being connected to the brushes in the other position of the switch. In both positions of the switch the primary of the transformer is connected in parallel with the main inducing winding.

In order to increase the starting torque, it will, in some cases, be of advantage to impress an E. M. F. on the working brushes, and this E. M. F. may be derived from the secondary winding 16 of the transformer as illustrated in Fig. 5.

In the motors described, the magnitude of the starting torque will depend upon the ratio of the number of the turns of the auxiliary winding, to the turns of the main inducing winding, and also upon the ohmic and the inductive resistances of the circuit which includes the exciting brushes. The speed of the motor when in operation will depend upon the ratio of the turns of the auxiliary winding to those of the main inducing winding, and upon the magnitude and direction of the E. M. F. impressed on the exciting brushes.

Having fully described my invention, what I claim as new and desire to secure by Letters Patent of the United States is:

1. In an alternating current motor, the combination with an inducing member provided with a main inducing winding and an auxiliary winding connected in series therewith, of an induced member closed by way of brushes along an axis approximately coinciding with the axis of the main inducing winding, means for impressing on the induced member along an axis displaced from the axis of the main inducing winding an E. M. F. derived from said winding, and means for changing the direction of the current through the main inducing winding without changing the direction of said E. M. F. and without changing the current through the auxiliary winding.

2. In an alternating current motor, the combination with an inducing member provided with a main inducing winding and an auxiliary winding, of an induced member having working brushes in the axis of the main inducing winding and exciting brushes displaced from the working brushes, a transformer having three groups of interconnected coils, one or more of said groups being connected in parallel with the main inducing winding, and means for connecting either of two of said groups of coils to the exciting brushes, said means being adapted to connect a given terminal of one of said groups to a different exciting brush from that to which the corresponding terminal of the other group is adapted to be connected.

3. In an alternating current motor, the combination with an inducing member provided with a main inducing winding and an auxiliary winding, of an induced member having working brushes in the axis of the main inducing winding and exciting brushes displaced from the working brushes, a transformer having three groups of interconnected coils, one or more of said groups being connected in parallel with the main inducing winding and one group being connected to the exciting brushes, and the switch arranged to simultaneously reverse the direction of the current through the main inducing winding, disconnect one coil group from the exciting brushes and connect another coil group to said brushes but in reverse direction from that in which the first mentioned coil group was connected.

In testimony whereof, I have hereunto set my hand and affixed my seal in the presence of the two subscribing witnesses.

OTTO KNÖPFLI. [L. S.]

Witnesses:
 CARL ERRENSEN,
 EMIL CONRAD REDINGER.